UNITED STATES PATENT OFFICE.

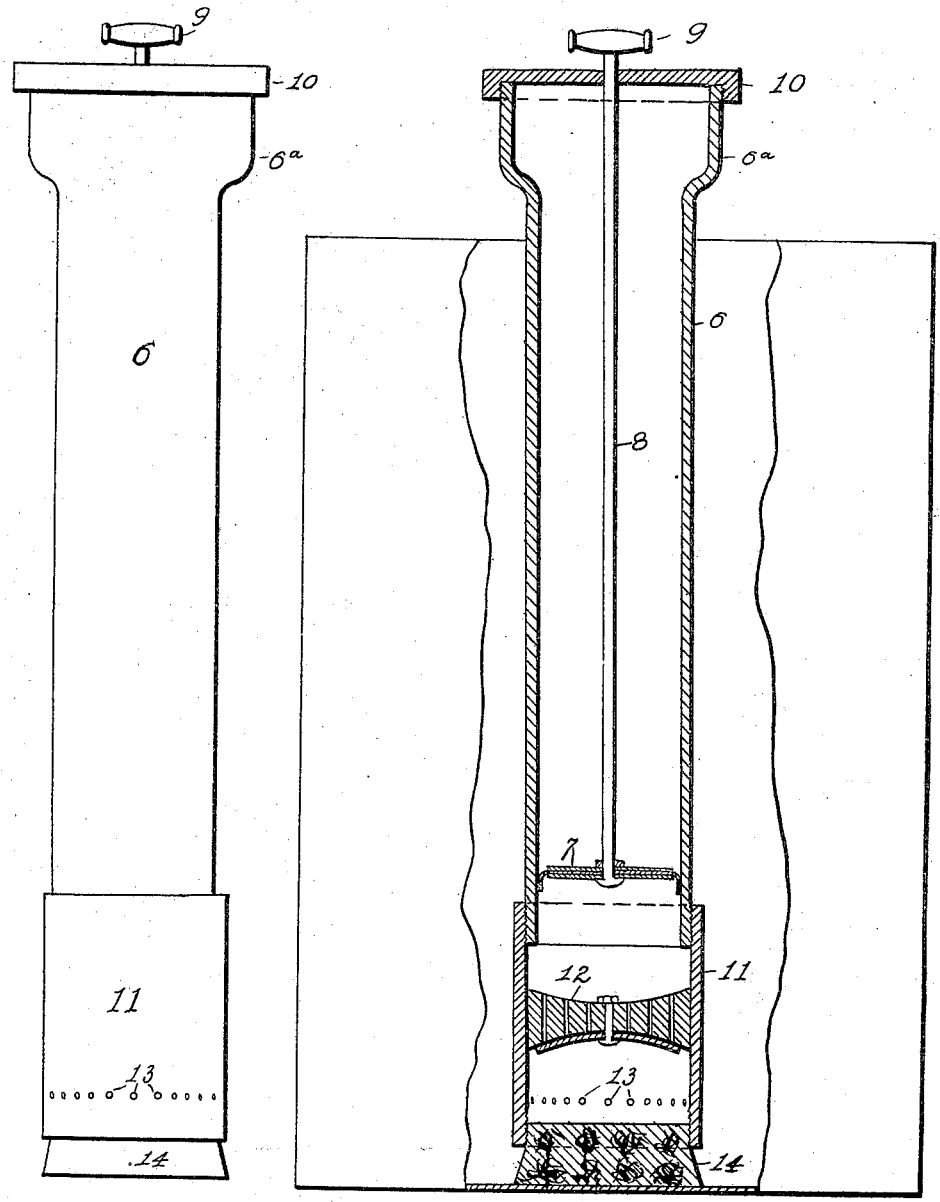

FRANK M. REYNOLDS, OF KNOXVILLE, IOWA.

MILK COOLER AND AERATOR.

SPECIFICATION forming part of Letters Patent No. 695,171, dated March 11, 1902.

Application filed July 18, 1901. Serial No. 68,813. (No model.)

*To all whom it may concern:*

Be it known that I, FRANK M. REYNOLDS, a citizen of the United States, residing at Knoxville, in the county of Marion and State of Iowa, have invented certain new and useful Improvements in Milk Coolers and Aerators; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to coolers and aerators. Its object is to expel animal or other heat and noxious volatile matters from milk by forcing air therethrough. The invention also comprises means for forcing water through milk for the same purpose. It comprises a pump which may be used for either air or water and which can be moved so that it can be readily and quickly used in a number of cans or vessels.

My invention is hereinafter described, and is illustrated in the accompanying drawings, in which—

Figure 1 is an elevation of the device. Fig. 2 is a longitudinal section thereof in a milk-can.

Referring more particularly to the drawings, the device comprises a force-pump having a cylinder 6, valved piston 7, and a piston-rod 8, to the outer end of which is attached a handle 9, by which the piston is reciprocated. The top of the cylinder is slightly spread or flared, as at 6ª, so that the piston may readily be inserted in the cylinder. The top of the cylinder is closed by a removable cap 10. The lower end of the cylinder is screw-threaded to receive a cylindrical section 11, which forms a continuation of the cylinder. This section contains the pump-valve 12, comprising a perforated diaphragm and flap, opening downwardly. Below the valve the section has small perforations 13, through which the air is discharged. The lower end of the section is closed by a cork or rubber plug 14, which projects beyond the end of the section.

The cylinder of the pump is preferably made of metal and somewhat longer than the depth of an ordinary milk-can, so that when placed within the can it reaches the bottom thereof, with the top of the cylinder above the milk. In this position by operation of the pump air is forced into the milk near the bottom of the can in a fine spray or bubbles, which rise through the milk on all sides, thereby accomplishing the object of the invention. The plug 14, of elastic material, causes the air to be discharged through the perforations. It also prevents any damage to the bottom of the can which would otherwise be due to the contact of the metallic cylinder therewith. The plug also serves to increase the ease of operation by preventing the pump slipping or moving around in the can.

Both ends of the section 11 are screw-threaded, so that the section may be reversed upon the cylinder with the perforations 13 above the valve 12. In this position an effective means of spraying water into the milk is formed by removing the piston, filling the cylinder with water, and then inserting the piston and forcing the water out through the perforations.

It will be seen that the parts of the device can be readily separated and cleaned, which is an important advantage in devices of this character. The cap, piston, and lower section can be removed, leaving the cylinder open at both ends for the passage of a swab to clean it. All the other parts are also readily accessible for the purpose of cleansing.

By the process or invention herein contemplated cold water may be added to the milk for the purpose of aiding in the separation of the milk from the cream, and after the cold water is so added air can be pumped into the milk in the manner before described, and by so doing the cream will be separated from the milk in the same manner, as by a spray.

Having thus described the invention, what is claimed as new, and desired to be secured by Letters Patent, is—

1. A milk cooler and aerator comprising a valved pump-cylinder having perforations near the lower end thereof, a valved piston therein and a removable elastic plug in the lower end of the cylinder.

2. A milk cooler and aerator comprising a pump-cylinder, a valved piston therein, a reversible cylindrical section screwed to the lower end of the cylinder having perforations adapted to discharge a spray, a valve therein, and a removable elastic plug in the lower end of the said section.

In testimony whereof I affix my signature in presence of two witnesses.

FRANK M. REYNOLDS.

Witnesses:
W. A. McKER, Jr.,
S. P. MARTIN.